(12) United States Patent
Meuer et al.

(10) Patent No.: US 9,035,014 B2
(45) Date of Patent: May 19, 2015

(54) PROCESS FOR PREPARING CONDENSATION RESINS

(75) Inventors: Stefan Meuer, Worms (DE); Klaus Menzel, Ludwigshafen (DE); Kai Stehmeier, Mannheim (DE); Guenter Scherr, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/984,403

(22) PCT Filed: Feb. 13, 2012

(86) PCT No.: PCT/EP2012/052368
§ 371 (c)(1),
(2), (4) Date: Aug. 8, 2013

(87) PCT Pub. No.: WO2012/110436
PCT Pub. Date: Aug. 23, 2012

(65) Prior Publication Data
US 2013/0317194 A1    Nov. 28, 2013

(30) Foreign Application Priority Data

Feb. 14, 2011  (EP) .................................... 11154334

(51) Int. Cl.
*C08G 12/12* (2006.01)
*C08L 61/24* (2006.01)

(52) U.S. Cl.
CPC ................. *C08G 12/12* (2013.01); *C08L 61/24* (2013.01)

(58) Field of Classification Search
CPC ...................................................... C08G 12/12
USPC ......................................... 528/243, 256, 263
See application file for complete search history.

(56) References Cited

U.S. PATENT DOCUMENTS

| 4,233,247 | A  | 11/1980 | Immel et al. |
| 4,243,797 | A  | 1/1981 | Petersen et al. |
| 4,263,181 | A  | 4/1981 | Wagner et al. |
| 4,341,650 | A  | 7/1982 | Wagner et al. |
| 4,855,394 | A  | 8/1989 | Goeckel et al. |
| 2006/0052522 | A1 | 3/2006 | Burckhardt et al. |
| 2007/0004893 | A1 | 1/2007 | Burckhardt et al. |
| 2008/0199621 | A1 | 8/2008 | Burckhardt et al. |
| 2012/0116047 | A1 | 5/2012 | Meuer et al. |
| 2013/0102716 | A1 | 4/2013 | Börzsönyi et al. |

FOREIGN PATENT DOCUMENTS

| DE | 25 07 461 A1 | 9/1976 |
| DE | 27 02 282 | 7/1978 |
| DE | 27 14 516 | 10/1978 |
| EP | 0 008 420 A1 | 3/1980 |
| EP | 0 210 471 A2 | 2/1987 |
| GB | 1 535 826 | 12/1978 |
| WO | WO 97/08255 | 3/1997 |
| WO | WO 03/059978 A1 | 7/2003 |
| WO | WO 2007/028752 A1 | 3/2007 |
| WO | WO 2011/009765 A1 | 1/2011 |

OTHER PUBLICATIONS

International Search Report issued May 25, 2012 in Application No. PCT/EP2012/052368.

*Primary Examiner* — Michael L Leonard
(74) *Attorney, Agent, or Firm* — Oblon, McClelland, Maier & Neustadt, L.L.P.

(57) ABSTRACT

The present invention relates to a new process for preparing condensation resins, constructed formally from urea, formaldehyde, and CH-acidic aldehydes.

19 Claims, No Drawings

PROCESS FOR PREPARING CONDENSATION RESINS

The present invention relates to a new process for preparing condensation resins, constructed formally from urea, formaldehyde, and CH-acidic aldehydes.

Condensation products of urea and/or derivatives thereof with formaldehyde and CH-acidic aldehydes are already known from the patent literature. Condensation resins of this kind are frequently used to provide pigment preparations.

A disadvantage of this procedure is the presence of formaldehyde, owing to its toxicity, and of CH-acidic aldehydes, which as free aldehydes have a relatively low flash point. Thus, for example, isobutyraldehyde has an ignition temperature of about 190° C., meaning that the production equipment must be fitted with special safety mechanisms.

It was an object of the present invention to develop a preparation process for condensation products derived from urea, formaldehyde, and CH-acidic aldehydes that makes it possible to do without the direct use of formaldehyde and CH-acidic aldehydes.

The object has been achieved by means of a process for preparing condensation resins derived from urea, formaldehyde, and CH-acidic aldehydes by reacting at least one, preferably precisely one, urea of the general formula (I) and/or (II)

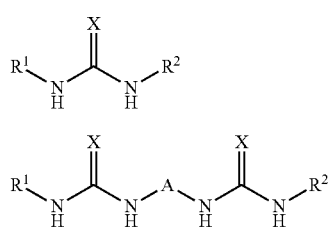

in which $R^1$ and $R^2$ independently of one another are hydrogen or identical or different $C_1$-$C_{20}$ alkyl radicals, A is a $C_1$-$C_{20}$ alkylene radical, and X is oxygen or sulfur with at least one, preferably precisely one, 3-hydroxypropionaldehyde derivative of the formula (IIIa)

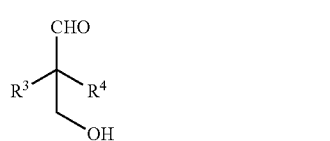

in which the radicals $R^3$ and $R^4$ independently of one another are identical or different alkyl, cycloalkyl, aryl or alkylaryl radicals or $R^3$ and $R^4$ together may form a ring.

An advantage of the process of the invention is that it is possible to do without the direct presence of formaldehyde and CH-acidic aldehydes in the preparation of the condensation resins.

The term "condensation resins derived from urea, formaldehyde, and CH-acidic aldehydes" means in the context of the present invention that the condensation resins in question comprise urea, formaldehyde, and CH-acidic aldehyde as formal construction components and are also obtainable by reaction of these three compounds.

The following details may be given about the construction components of the resins of the invention:

Suitable ureas are those of the general formula (I) or (II)

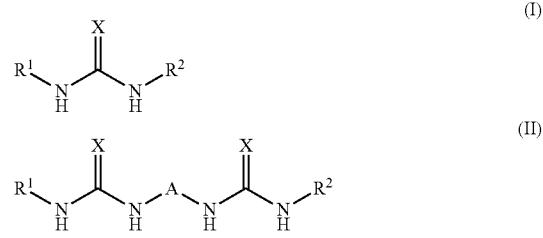

in which $R^1$ and $R^2$ independently of one another are hydrogen or identical or different $C_1$-$C_{20}$, preferably $C_1$ to $C_4$, alkyl radicals, A is a $C_1$-$C_{20}$, preferably $C_1$ to $C_4$, more preferably $C_1$ to $C_3$, and very preferably $C_1$ to $C_2$, alkylene radical, and X is oxygen or sulfur, preferably oxygen.

Besides urea or thiourea it is also possible to use monosubstituted and disubstituted ureas and also alkylenediureas.

Urea ($H_2N$—(CO)—$NH_2$) serves preferably for preparing the resins of the invention.

In the 3-hydroxypropionaldehyde derivatives of the formula (IIIa)

that are for use in accordance with the invention, the radicals $R^3$ or $R^4$ independently of one another are identical or different $C_1$-$C_{20}$, preferably $C_1$ to $C_4$ alkyl, $C_3$-$C_{20}$, preferably $C_5$ to $C_{12}$ cycloalkyl, $C_6$-$C_{20}$, preferably $C_6$ to $C_{12}$ aryl, or alkylaryl radicals, or $R^3$ and $R^4$ may together form a ring.

Examples of $C_1$-$C_{20}$ alkyl radicals are methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hetadecyl, octadecyl, 1,1-dimethylpropyl, 1,1-dimethylbutyl, and 1,1,3,3-tetramethylbutyl.

Examples of $C_3$-$C_{20}$ cycloalkyl radicals are cyclopropyl, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, and norbornyl.

Examples of $C_6$-$C_{20}$ aryl or alkylaryl radicals are phenyl, tolyl, xylyl, α-naphthyl, β-naphthyl, 4-biphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, benzyl, 1-phenylethyl, 2-phenylethyl, α,α-dimethylbenzyl, benzhydryl, p-tolylmethyl, and 1-(p-butylphenyl)ethyl.

$C_1$-$C_4$ Alkyl in the context of this specification means methyl, ethyl, isopropyl, n-propyl, n-butyl, isobutyl, sec-butyl, and tert-butyl, preferably methyl, ethyl, n-propyl, and n-butyl, more preferably methyl and ethyl, and very preferably methyl.

Examples of radicals $R^1$ and $R^2$ are independently of one another hydrogen and $C_1$ to $C_4$ alkyl, preferably hydrogen and methyl, and more preferably hydrogen.

Examples of possible alkylene radicals A are methylene, 1,2-ethylene, 1,2-propylene, 1,3-propylene, 1,4-butylene, 1,6-hexylene, 2-methyl-1,3-propylene, 2-ethyl-1,3-propylene, 2,2-dimethyl-1,3-propylene, and 2,2-dimethyl-1,4-butylene.

Preferred radicals A are methylene, 1,2-ethylene, 1,2-propylene, and 1,3-propylene, more preferably methylene and 1,2-ethylene, and more preferably methylene.

Preferably, the radicals $R^3$ and $R^4$ are independently of one another preferably alkyl or cycloalkyl, more preferably $C_1$ to $C_4$ alkyl, very preferably methyl, ethyl, n-propyl, and n-butyl, more particularly methyl, ethyl, and n-butyl, and especially methyl.

Where the radicals $R^3$ and $R^4$ together with the carbon atom $C_\alpha$ adjacent to the carbonyl group form a ring, the ring in question is preferably a five- to twelve-membered ring, as for example cyclopentyl, cyclohexyl, cyclooctyl or cyclododecyl, preferably cyclopentyl, cyclohexyl or cyclododecyl, and more preferably cyclopentyl or cyclohexyl.

Examples of 3-hydroxypropionaldehyde derivatives of the formula (IIIa) are preferably 3-hydroxypropionaldehyde derivatives containing exclusively alkyl and/or cycloalkyl groups.

Particularly preferred are 3-hydroxy-2,2-dimethylpropionaldehyde, 3-hydroxy-2-ethyl-2-n-butylpropionaldehyde, 3-hydroxy-2-methyl-2-n-propylpropionaldehyde, and 3-hydroxy-2-ethyl-2-n-butylpropionaldehyde; 3-hydroxy-2,2-dimethylpropionaldehyde is very preferred.

The 3-hydroxypropionaldehyde derivatives of the formula (IIIa) are obtained preferably by aldol reaction of the corresponding CH-acidic aldehydes of the general formula (III)

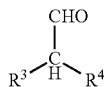

(III)

in which the radicals $R^3$ and $R^4$ are as defined above with formaldehyde.

By CH-acidic aldehydes here are meant those aldehydes which have precisely one hydrogen atom on the carbon atom $C_\alpha$ adjacent to the carbonyl group.

Examples of CH-acidic aldehydes are preferably CH-acidic aldehydes containing exclusively alkyl and/or cycloalkyl groups, more preferably isobutyraldehyde, 2-ethylhexanal, 2-methylpentanal, and isovaleraldehyde, very preferably isobutyraldehyde, 2-ethylhexanal, and 2-methylpentanal, and more particularly isobutyraldehyde.

The formaldehyde can be used in the form of an aqueous solution having a strength, for example, of 30% to 55%, preferably 35% to 49%, more preferably 40% to 49%, or in the form of paraformaldehyde or in the form of trioxane, tetroxane or formaldehyde acetals, and preferably in aqueous solution.

The aldol reaction is carried out generally in the temperature range between 40 and 120, preferably 50 and 100° C., and more preferably from 50 to 80° C.

The reaction is catalyzed in general by the presence of tertiary amines, preferably such as trimethylamine or triethylamine. Examples of suitable catalysts are described in DE 2507461, column 4, line 21 to column 5, line 21, particularly column 6, line 68 to column 7, line 54 (=GB 1535826, page 2, line 23 to page 3, line 6 and particularly page 4, line 31 to page 5, line 51), DE 2714516, page 7, paragraph 3 to page 8, paragraph 2 (=U.S. Pat. No. 4,233,247, column 2, line 53 to column 3, line 21), and DE 2702282, page 6, line 13 to page 7, line 17. The indicated passages of these specifications are hereby part of the present disclosure content.

The aldol reaction described is the first step for the industrial synthesis of diols by reaction of CH-acidic aldehyde (III) with formaldehyde to give the 3-hydroxypropionaldehyde derivatives of the formula (IIIa), followed by a Cannizzaro reaction or hydrogenation in a second step for the reduction of the aldehyde group.

Examples of diols frequently prepared by this process are neopentyl glycol (2,2-dimethyl-1,3-propanediol) and 2-ethyl-2-n-butyl-1,3-propanediol.

The 3-hydroxypropionaldehyde derivative of the formula (IIIa) is taken from this process generally in the form of an aqueous solution with a strength of 30% to 90%, preferably 40% to 80%, and more preferably 60% to 75%. Formaldehyde has generally already been removed from these solutions, but may still be bound via hydroxyl groups in the form of formals. In general, the amount of formaldehyde, in the form bound as a formal or in unbound form, is not more than 5% by weight, preferably not more than 3%, more preferably not more than 1%, and very preferably not more than 0.5% by weight.

Accordingly it is possible with the aid of the process of the invention to limit the operation with formaldehyde and CH-acidic aldehyde (III), associated with the disadvantages referred to at the outset, to a process, specifically in the process for preparing 3-hydroxypropionaldehyde as an intermediate in the preparation of diols, so that now only one spatially separate production plant, instead of two as before, has to be fitted with special safety mechanisms.

For the process of the invention, urea and 3-hydroxypropionaldehyde derivative are used generally in a molar ratio of 1:2 to 1:12, preferably 1:3 to 1:10, and very preferably of 1:4 to 1:8.

The process of the invention is carried out preferably in the presence of acids or bases as catalyst and optionally in the presence of solvent and/or diluent.

Suitable acids include inorganic and organic acids, preferably acids having a $pK_a$ of up to 3. Examples thereof are sulfuric acid, phosphoric acid, nitric acid, hydrochloric acid, phosphorous acid ($H_3PO_3$), diphosphoric acid ($H_4P_2O_7$), sulfonic acids, more preferably methanesulfonic acid, trifluoromethanesulfonic acid, para-toluenesulfonic acid, benzenesulfonic acid, dodecylbenzenesulfonic acid, cyclododecanesulfonic acid, camphorsulfonic acid or acidic ionic exchangers with sulfonic acid groups, and also formic acid.

It is also possible, though less preferable, to catalyze the condensation basically. For this purpose it is possible to use basic alkali metal compounds, alkaline earth metal compounds or quaternary ammonium compounds, preferably alkali metal compounds, more preferably sodium or potassium, very preferably sodium, examples being oxides, hydroxides (OH), carbonates ($CO_3^{2-}$), amides ($NH_2^-$) or $C_1$ to $C_{20}$ alkoxides, preferably hydroxides or $C_1$ to $C_4$ alkoxides, more preferably hydroxides, methoxides, ethoxides or tert-butoxides, very preferably hydroxides or methoxides.

The catalyst is used generally in amounts of 0.5 to 30 mol %, based on the CH-acidic aldehyde, preferably in amounts of 2 to 20, more preferably 3 to 10 mol %.

Especially if basic compounds are used, then phase transfer catalysts as well can be added additionally.

Preferred phase transfer catalysts are tetrasubstituted ammonium salts, more preferably of the formula $$^+NR^5R^6R^7R^8X^-,$$

in which

R[5] to R[8] each independently of one another are $C_1$ to $C_{20}$ alkyl or $C_6$ to $C_{20}$ alkylaryl radicals and X[−] is an anion of an acid.

The radicals R[5] to R[8] preferably have a total of at least 8, preferably at least 12, more preferably at least 15 carbon atoms.

Examples of anions X[−] are chloride, bromide, iodide, sulfate, methyl sulfate, ethyl sulfate, methyl carbonate, trifluoromethanesulfonate, $C_1$-$C_{20}$ alkylsulfonate or $C_6$-$C_{20}$ alkylarylsulfonate.

When carrying out the process of the invention it is possible optionally to use solvents and/or diluents, optionally also as entraining agents for the azeotropic removal of water. Suitable solvents for the azeotropic removal of water include, in particular, aliphatic, cycloaliphatic, and aromatic hydrocarbons or mixtures thereof. Employed with preference are n-pentane, n-hexane, n-heptane, cyclohexane, methylcyclohexane, benzene, toluene or xylene. Particularly preferred are cyclohexane, methylcyclohexane, xylene, and toluene.

Aromatic hydrocarbons in particular have proven themselves as solvents. Among these, xylene is deserving of particular emphasis.

The use of entraining agents for the azeotropic removal of water is preferred in the process of the invention.

The process of the invention is carried out generally in the temperature range from 70 to 150, preferably from 80 to 120° C. and more preferably from 80 to 100° C.

Depending on temperature, the reaction generally takes a time of 10 minutes to 6 hours, preferably of 30 minutes to 5 hours, more preferably of 1 to 4 hours.

In the process of the invention it is not absolutely necessary to make the reaction mixture water-free. In general it is sufficient to remove the water from the reaction mixture down to a level of not more than 5% by weight, preferably not more than 2.5% by weight.

The condensation resin may optionally also be prepared in the presence of at least one, as for example 1 to 4, preferably 1 to 3, more preferably 1 to 2, and very preferably precisely one compound (IV) which contains precisely two nucleophilic groups selected from the group consisting of hydroxyl groups (—OH), primary amino groups (—NH$_2$), secondary amino groups (—NH—), and thiol groups (—SH), preferably selected from the group consisting of hydroxyl groups (—OH), primary amino groups (—NH$_2$), and secondary amino groups (—NH—), more preferably selected from the group consisting of hydroxyl groups (—OH) and primary amino groups (—NH$_2$), and very preferably the nucleophilic groups are hydroxyl groups (—OH). The presence of at least one compound (IV) is preferred.

This compound (IV) may contain two identical nucleophilic groups, making it a diol, a diamine or a dithiol, although the compound (IV) may also carry different nucleophilic groups, thus making it an amino alcohol, a mercapto alcohol or a mercaptoamine.

Preferred compounds (IV) are diols, diamines, amino alcohols and mercapto alcohols, more preferably diols, diamines, and amino alcohols, very preferably diols and amino alcohols, and more particularly diols.

The diol is preferably an alkanediol or cycloalkanediol, more preferably a 1,2- or 1,3-alkanediol.

The diol is preferably of low molecular weight, i.e., it preferably has a molecular weight of below 400 g/mol.

With particular preference the diol is ethylene glycol, 1,2-propanediol, 1,3-propanediol, 3-methylpentane-1,5-diol, 2-ethyl-1,3-hexanediol, diethylene glycol, dipropylene glycol, 2,4-diethyloctane-1,3-diol, 1,1-dimethylethane-1,2-diol, 2-butyl-2-ethyl-1,3-propanediol, 2-ethyl-2-methyl-1,3-propanediol, neopentyl glycol, neopentyl glycol hydroxypivalate, 1,2-, 1,3- or 1,4-butanediol, 1,6-hexanediol, 1,10-decanediol, 2,2-bis(4-hydroxycyclohexyl)propane, 1,1-, 1,2-, 1,3- and 1,4-cyclohexanedimethanol, tetramethylcyclobutanediol, 1,2-, 1,3- or 1,4-cyclohexanediol, cyclooctanediol, norbornanediol, pinanediol, decalindiol, hydroquinone, bisphenol A, bisphenol F, bisphenol B, and bisphenol S.

Very particular preference is given to 1,2-propanediol, ethylene glycol, 1,3-propanediol or neopentyl glycol.

Examples of diamines are compounds containing two primary and/or secondary amino groups, preferably either two primary or two secondary amino groups, and more preferably two primary amino groups.

Preferred diamines are alkanediamines featuring a linear or branched and optionally substituted alkylene radial containing 2 to 20, preferably 2 to 12, more preferably 2 to 6 carbon atoms; cycloalkanediamines featuring an optionally substituted cycloalkylene radical containing 3 to 12, preferably 5 to 6, carbon atoms; arylenediamines featuring an optionally substituted arylene radical containing 6 to 12, preferably 6, carbon atoms; and diazacycloalkanes containing 4 to 12, preferably 4 to 8, carbon atoms. Of these, alkanediamines and diazacycloalkanes are preferred, particular preference being given to alkanediamines.

Examples of alkanediamines are 1,2-ethylenediamine, 1,3-propylenediamine, 1,4-butanediamine, 1,5-pentanediamine, 1,6-hexanediamine, 2,2,4-trimethylhexane-1,6-diamine, 2,2,4,4-tetramethylhexane-1,6-diamine, 1,8-octanediamine, 1,10-decanediamine, and 1,12-dodecanediamine, preferably 1,2-ethylenediamine, 1,3-propylenediamine, 1,4-butanediamine, 1,5-pentanediamine, and 1,6-hexanediamine, more preferably 1,2-ethylenediamine, 1,4-butanediamine, and 1,6-hexanediamine, and very preferably 1,2-ethylenediamine and 1,6-hexanediamine.

Also conceivable is 2,2'-oxydiethanamine (2-(2'-aminoethoxy)ethylamine), ornithine $C_1$-$C_4$ alkyl esters or lysine $C_1$-$C_4$ alkyl esters.

Examples of cycloalkanediamines are 1,4-, 1,3- or 1,2-diaminocyclohexane or 2,4-, or 2,6-diamino-1-methylcyclohexane.

Other diamines comprising cycloalkane groups are 4,4'- or 2,4'-di(aminocyclohexyl)methane, 1-amino-3,3,5-trimethyl-5-(aminomethyl)cyclohexane (isophoronediamine), 1,3- or 1,4-bis(aminomethyl)cyclohexane, and also 3 (or 4),8 (or 9)-bis(aminomethyl)-tricyclo[5.2.1.0$^{2.6}$]decane isomer mixtures.

Examples of arylenediamines are 1,2-, 1,3-, and 1,4-phenylenediamines, 2,4- and 2,6-toluenediamine, and the isomer mixtures of these.

One noteworthy diazacycloalkane is piperazine.

Examples of dithiols include 1,2-ethanedithiol, 1,3-propanedithiol, 2,2-dimethyl-1,3-propanedithiol, 1,4-butanedithiol, 1,5-pentanedithiol, and 2,2'-oxydiethanethiol, preferably 1,2-ethanedithiol and 1,3-propanedithiol.

Examples of amino alcohol include alkanolamines featuring a linear or branched and optionally substituted alkylene radical containing 2 to 20, preferably 2 to 12, more preferably 2 to 6 carbon atoms; cycloalkanolamines featuring an optionally substituted cycloalkylene radical containing 3 to 12, preferably 5 to 6, carbon atoms; and aminophenols featuring an optionally substituted arylene radical containing 6 to 12, preferably 6, carbon atoms.

Examples of alkanolamines are 2-aminoethan-1-ol, 2-aminopropan-1-ol, 1-aminopropan-2-ol, 3-aminopropan-1-ol, 4-aminobutan-1-ol, 6-aminohexan-1-ol, N-methyldiethanolamine, N-methyldipropanolamine, 2-amino-1-phenylethanol, and 2-amino-2-phenylethanol. Preference is given to 2-aminoethan-1-ol and 2-aminopropan-1-ol.

Also conceivable are serine $C_1$-$C_4$ alkyl esters or threonine $C_1$-$C_4$ alkyl esters.

Examples of cycloalkanolamines include 2-aminocyclopentan-1-ol, 2-aminocyclohexan-1-ol, 2-aminocyclooctan-1-ol, and 2-aminocyclododecan-1-ol.

Examples of aminophenols include 2-aminophenol, 3-aminophenol, and 4-aminophenol, and also tyrosine $C_1$-$C_4$ alkyl esters.

Examples of mercapto alcohols include 2-mercaptoethanol, 2-mercaptophenol, and 2-hydroxy-1-propanethiol.

Examples of mercaptoamines include 2-aminothiophenol, 4-aminothiophenol, 2-mercaptoethylamine, cysteine $C_1$-$C_4$ alkyl esters, and homocysteine $C_1$-$C_4$ alkyl esters.

Compound (IV) may be present right from the start of the reaction, but preferably it is added when urea and 3-hydroxypropionaldehyde derivative have already undergone at least partial reaction with one another.

Since, as described above, the 3-hydroxypropionaldehyde derivative (IIIa) may preferably be withdrawn from the diol synthesis and since, in the preparation of the 3-hydroxypropionaldehyde derivative (IIIa), a small fraction of diol may have already been formed, through Cannizzarro reaction of the 3-hydroxypropionaldehyde derivative with formaldehyde, and may therefore be present in the 3-hydroxypropionaldehyde derivative (IIIa) solution that is used, one preferred embodiment of the present invention, when a compound (IV) is present, is to use as compound (IV) the diol corresponding to the hydroxypropionaldehyde derivative (IIIa).

In the case of 3-hydroxy-2,2-dimethylpropionaldehyde as compound (IIIa), this diol is for example neopentyl glycol (2,2-dimethyl-1,3-propanediol) as compound (IV).

The conversion rate may be determined, for example, from the amount of water discharged, or alternatively by monitoring of the viscosity of the reaction mixture. The conversion rate is preferably relative to the aldehyde functions that have already been reacted. The free aldehyde functions are determined preferably by the method of De Jong (DIN EN ISO 9020). The conversion rate thus determined ought in general to be at least 30%, preferably at least 40%, more preferably at least 50%, very preferably at least 60%, and more particularly at least 70%.

The conversion rate at the time of addition of compound (IV) ought generally to have advanced no further than 99.9%, preferably not more than 99.5%, more preferably not more than 98%, very preferably not more than 95%, and more particularly not more than 90%.

Compound (IV) may be added to the reaction mixture in portions or, preferably, in one addition.

The reaction ought to be continued for at least one hour after the addition of the compound (IV), at a temperature of 50 to 150° C., so that the compound (IV) is incorporated substantially into the condensation resin. If desired, the reaction may be pursued following the addition, under superatmospheric or subatmospheric pressure, preferably under subatmospheric pressure.

The amount of the compound (IV), based on the amount of urea used, is 0.3 to 4 equivalents, preferably 0.5 to 3.5 equivalents, and more preferably 0.7 to 2.5 equivalents.

In one preferred embodiment the reaction of the invention is carried out additionally in the presence of at least one, as for example one to three, preferably one to two, and more preferably precisely one alcohol (V), preferably an alkanol, more preferably a $C_1$ to $C_{20}$ alkanol, very preferably a $C_1$ to $C_{10}$ alkanol, and especially a $C_2$ to $C_8$ alkanol.

Examples of alcohols, in addition to the alkanols listed below, include, for example, alkylene glycol and polyalkylene glycol monoalkyl ethers having a molar weight of up to 300 g/mol, preferably polyethylene glycol monoalkyl ethers, preferably ethylene glycol monomethyl ether, ethylene glycol monoethyl ether, and 1,3-propanediol monomethyl ether.

Examples of alkanols are methanol, ethanol, isopropanol, n-propanol, n-butanol, isobutanol, sec-butanol, tert-butanol, n-pentanol, n-hexanol, n-heptanol, n-octanol, 2-ethylhexanol, n-decanol, n-dodecanol (lauryl alcohol), stearyl alcohol, cetyl alcohol, and lauryl alcohol.

Preferred compounds (V) are methanol, ethanol, isopropanol, n-propanol, and n-butanol, more preferably methanol, ethanol, and n-butanol, very preferably methanol and n-butanol, and more particularly n-butanol.

Compound (V) may be present right from the start of the reaction, but is preferably added when formaldehyde, urea, and CH-acidic aldehyde have already undergone at least partial reaction with one another.

Compound (V) may be added to the reaction mixture in portions or preferably in one addition.

In one preferred embodiment compound (V) is added before compound (IV).

The reaction ought to be continued following the addition of the compound (V) for at least one hour, preferably at least 2 hours, very preferably at least 3 hours, at 50 to 150° C., so that the compound (V) is substantially incorporated into the condensation resin.

If desired, the reaction may be pursued, following addition, under superatmospheric or subatmospheric pressure, preferably under superatmospheric pressure.

The amount of compound (V), based on the amount of urea used, is 0.05 to 4 equivalents, preferably 0.3 to 3 equivalents, and more preferably 0.5 to 1.5 equivalents.

When the desired molecular weight or conversion rate has been reached, the condensation is stopped.

An acidic condensation is stopped by neutralization with a base, such as sodium or potassium alkoxide, for example, and preferably NaOH or KOH, and the water present is removed along with any distillatively separable lower oligomers or unreacted monomers that may be present, by distillation or stripping.

In a similar way, a basic condensation is stopped by neutralization with acid.

In accordance with the invention it is possible with preference to omit neutralization with acid.

Generally it is sufficient if the salt is washed out with water and the resin dissolved in the organic solvent phase is freed from the solvent by distillation.

The solvent is generally separated off to a residual level of not more than 5% by weight, preferably not more than 4% by weight, more preferably not more than 3% by weight, very preferably not more than 2% by weight, and more particularly not more than 1% by weight.

The preparation of the resins of the invention is possible both batchwise and continuously.

The condensation resins obtained by the process of the invention are not substantially different from the products obtained by the corresponding conventional processes, by reaction of urea, formaldehyde, and CH-acidic aldehydes.

They generally have a number-average molar weight $M_n$ of 400 to less than 1000 g/mol, preferably of 450 to 950 g/mol, and more preferably of 500 to 900 g/mol, a weight-average molar weight $M_w$ of 700 to 3000, and a polydispersity of 1.4 to 3.0.

The values for the number-average and weight-average molecular weight $M_n$ and $M_w$ were determined by means of gel permeation chromatography measurements on PL-GEL (3-column combination; 1× Mini-Mix C and 2× Mini-Mix E). The eluent used was THF. Calibration was carried out using polystyrene/hexylbenzene reference materials having polydispersities of <1.1. The values reported, unless they are for polymers of styrene, are therefore to be seen as polystyrene equivalents. Reference materials used: polystyrene from 3 000 000 to 580 g/mol and hexylbenzene 162 g/mol. The method is described in Analytiker Taschenbuch, vol. 4, pages 433 to 442, Berlin 1984.

The condensation resins generally have an acid number in accordance with DIN EN 2114 of less than 10 mg KOH/g, preferably of less than 8, more preferably of less than 5, very preferably of less than 3, more particularly less than 2, and in special cases less than 1 mg KOH/g.

The condensation resins generally have a hydroxyl number in accordance with DIN ISO 4629 of 5 to 60 mg KOH/g, preferably of 10 to 50, more preferably of 15 to 45, and very preferably of 20 to 40 mg KOH/g.

The condensation resins generally have a saponification number in accordance with DIN 53401 of less than 100 mg KOH/g, preferably of 5 to 90, more preferably of 10 to 70, very preferably of 20 to 50 mg KOH/g.

The condensation resins generally have a residual monomer content of aldehyde (Ill), more particularly of isobutyraldehyde, of less than 500 ppm by weight, preferably of less than 400 ppm by weight, and very preferably of less than 300 ppm by weight.

The condensation resins generally have a residual monomer content of formaldehyde, of less than 500 ppm by weight, preferably of less than 400 ppm by weight, more preferably of less than 300 ppm by weight, very preferably of less than 200, and more particularly of less than 100 ppm by weight.

The condensation resins generally have a glass transition temperature $T_g$ by the DSC method (Differential Scanning calorimetry) in accordance with ASTM 3418/82, with a heating rate of 2.5° C./min, of less than 50° C., preferably of less than 40, more preferably of less than 30, very preferably of less than 20° C., and more particularly of less than 10° C.

The condensation resins prepared by the process of the invention are suitable especially for producing pigment preparations.

For this purpose, at least one pigment P and at least one condensation resin K of the invention, and also, optionally, at least one diluent V and also, optionally, at least one additive AD, are mixed with one another.

Such mixing may take place, for example, in a stirring vessel, mixer or extruder or preferably in a disperser or kneading apparatus.

Pigments according to CD Römpp Chemie Lexikon—Version 1.0, Stuttgart/New York: Georg Thieme Verlag 1995, with reference to DIN 55943, are particulate "colorants that are organic or inorganic, chromatic or achromatic, and are virtually insoluble in the application medium".

Virtually insoluble here means a solubility at 25° C. of below 1 g/1000 g of application medium, preferably below 0.5, more preferably below 0.25, very preferably below 0.1, and more particularly below 0.05 g/1000 g of application medium.

Examples of pigments P encompass any desired systems of absorption pigments and/or effect pigments, preferably absorption pigments. There are no restrictions whatsoever on the number and selection of the pigment components. They may be adapted as desired to the particular requirements, such as the desired perceived color, for example.

Effect pigments are all pigments which exhibit a platelet-shaped construction and give a surface coating specific decorative color effects. The effect pigments are, for example, all of the pigments which impart effect and can be used typically in vehicle finishing and in industrial coating. Examples of such effect pigments are pure metallic pigments, such as aluminum, iron or copper pigments, for example; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum, or liquid-crystal pigments.

The color-imparting absorption pigments are, for example, customary organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments and carbon black.

Titanium dioxide, additionally, may be cited as a pigment.

Examples of pigments P are listed in WO 97/08255, page 8 line 11 to page 11 line 16, hereby part of the disclosure content of this specification.

Examples of diluents V are aromatic and/or (cyclo)aliphatic hydrocarbons and mixtures thereof, halogenated hydrocarbons, esters, and ethers.

Preference is given to aromatic hydrocarbons, (cyclo)aliphatic hydrocarbons, alkyl esters of alkanoic acids, and alkoxylated alkyl esters of alkanoic acids, and mixtures thereof.

Particular preference is given to mono- or polyalkylated benzenes and naphthalenes, alkyl esters of alkanoic acids, and alkoxylated alkyl esters of alkanoic acids, and mixtures thereof.

Especially preferred are xylene and 1-methoxy-2-propyl acetate.

Preferred aromatic hydrocarbon mixtures are those which comprise predominantly aromatic $C_7$ to $C_{14}$ hydrocarbons and may span a boiling range from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising them.

Examples thereof are the Solvesso® products from ExxonMobil Chemical, particularly Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® products from Shell. Hydrocarbon mixtures comprising paraffins, cycloparaffins, and aromatics are also available commercially under the names Kristalloel (for example, Kristalloel 30, boiling range about 158-198° C., or Kristalloel 60: CAS No. 64742-82-1), white spirit (for example, likewise CAS No. 64742-82-1) or solvent naphtha (light: boiling range about 155-180° C., heavy: boiling range about 225-300° C.). The aromatics content of hydrocarbon mixtures of these kinds is generally more than 90% by weight, preferably more than 95, more preferably more than 98, and very preferably more than 99% by weight. It may be useful to use hydrocarbon mixtures having a particularly reduced naphthalene content.

Halogenated hydrocarbons are, for example, chlorobenzene and dichlorobenzene or the isomer mixtures thereof.

Esters are, for example, n-butyl acetate, ethyl acetate, 1-methoxy-2-propyl acetate, and 2-methoxyethyl acetate.

Ethers are, for example, THF, dioxane, and the mono- and dimethyl, -ethyl or -n-butyl ethers of ethylene glycol, diethylene glycol, triethylene glycol, propylene glycol, dipropylene glycol or tripropylene glycol.

(Cyclo)aliphatic hydrocarbons are, for example, decalin, alkylated decalin, and isomer mixtures of linear or branched alkanes and/or cycloalkanes.

Additionally preferred are n-butyl acetate, ethyl acetate, 1-methoxy-2-propyl acetate, 2-methoxyethyl acetate, and also mixtures thereof, more particularly with the aromatic hydrocarbon mixtures recited above.

For adjustment of the viscosity, the condensation resins prepared in accordance with the invention are formulated preferably as a 70% to 90% strength solution in xylene or 1-methoxy-2-propyl acetate.

Additives AD are, for example dispersants, leveling assistants, plasticizers, and rheological auxiliaries. Substances of these kinds are known to the skilled person.

The condensation resins obtained by the process of the invention are used preferably in pigment preparations comprising
- at least one pigment P,
- optionally at least one diluent V,
- at least one condensation resin K, and
- optionally at least one additive AD.

Typical compositions of such pigment preparations are
- 10%-80% by weight P,
- 0%-40% by weight V,
- 10%-70% by weight K, and
- 0%-15% by weight AD, with the proviso that the sum is always 100% by weight.

It is an advantage of the condensation resins that their use in the pigment preparations of the invention allows a greater amount of pigment P to be introduced (level of pigmentation) and/or allows the required amount of diluents V to be reduced, in each case as compared with analogous condensation resins having a softening point of 80° C. or more.

Furthermore, the color strength of the pigment preparations is increased through use of the condensation resins of the invention.

The condensation resins may be used, moreover, in combination with other, physically drying film formers typically intended for use as coating-material binders, such as cellulose derivatives, examples being nitrocellulose, ethylcellulose, cellulose acetate, cellulose acetobutyrate, chlorinated rubber, copolymers based on vinyl ester, vinyl ether, vinyl chloride, acrylic ester and/or vinylaromatics, examples being vinyl chloride/vinyl isobutyl ether copolymers, or chemically drying binders, such as alkyd resins, drying and semidrying oils, for producing coating materials, the amount of said condensation resin of the invention in these coating materials being variable within wide limits, but amounting in the majority of cases to not more than 50% by weight of the binder as a whole.

These coating-material binders are suitable, with application by customary techniques, such as spreading, spraying, casting, for the coating of substrates, such as wood, chipboard, paper, and metal, e.g., iron sheets.

The condensation resins obtained by the processes of the invention are substantially no different from the condensation resins obtained by conventional processes, and can be used in the same applications as those resins.

They have very advantageous processing properties. Coatings are obtained that have very good mechanical properties, good gloss, good light stability, and good water resistance. The coating-material binders of the invention can be used very advantageously, for example, in spray-applied matt finishes, quick-sanding primers, paper coatings, and anticorrosion coatings.

The parts and percentages indicated in the examples denote parts by weight and percentages by weight, respectively.

EXAMPLES

Example 1

968 g of hydroxypivalaldehyde (8 mol) in the form of a 70% strength aqueous solution were charged to a 2 l four-neck flask with bottom drain, and heated to 80° C. 49.82 g of urea (1 mol) in liquid form were added in such a way that the temperature of the flask does not drop below 60° C.

Then 5 drops of a total of 113.9 g of sulfuric acid (0.7 mol, 50% strength) were introduced, and, after the end of release of heat, the remainder of the sulfuric acid was run in.

The reaction mixture was subsequently held at this temperature at 80° C. over 3 hours.

Then 354 ml of o-xylene were added, the mixture was stirred for 5 minutes, and a phase separation was carried out at 80° C. The lower, aqueous phase was drained off and the organic phase was distilled under reduced pressure to 80° C. at 100 mbar. Subsequently a further 248 ml of o-xylene were added.

Added to this mixture were 86.39 g (1 mol) of neopentyl glycol and 12.61 g (0.08 mol) of toluene-4-sulfonic acid monohydrate.

1 mol of water of reaction was removed by distillation to a temperature of not more than 90° C. at 100 mbar; o-xylene from the distillate was returned to the flask.

This was followed by adjustment to a pH>7 using NaOH.

The organic phase was washed with four times 400 ml of distilled water. For phase separation, it was stirred at 80° C. and the aqueous phase was removed.

The product was distilled under reduced pressure of 100 mbar to 145° C. and the end product was adjusted with methoxypropyl acetate to around 20 000 mPas.

Yield: 752 g (677 g of crude resin in solution in 75 g of methoxypropyl acetate).

Comparative Example 1

490.29 g of formaldehyde (8 mol, 49% form) and 60.06 g of urea (1 mol) were mixed and left to stand at ambient temperature overnight.

This mixture was charged to a 2 l four-neck flask with bottom drain and heated to 55° C., and 5 drops of a total of 137.31 g of sulfuric acid (0.7 mol, 50% strength) were introduced. After the end of the release of heat, the remainder of the sulfuric acid was run in, and the batch was heated to reflux.

Then, over the course of around 15 minutes, 576.8 g of isobutyraldehyde (8 mol) were introduced dropwise.

The batch was subsequently heated to 80° C. and held at this temperature for 3 hours.

Then 427 ml of o-xylene were introduced dropwise, the mixture was stirred for 5 minutes, and a phase separation was carried out at 80° C. The lower, aqueous phase was drained off.

The organic phase was distilled under reduced pressure of 100 mbar to 80° C. Then a further 299 ml of o-xylene were added.

Added to this mixture were 104.15 g (1 mol) of neopentyl glycol and 15.2 g (0.08 mol) of toluene-4-sulfonic acid monohydrate.

1 mol of water of reaction was removed by distillation to a temperature of not more than 90° C. at 100 mbar; o-xylene from the distillate was returned to the flask.

This was followed by adjustment to a pH>7 using NaOH.

The organic phase was washed with four times 400 ml of distilled water. For phase separation, it was stirred at 80° C. and the aqueous phase was removed.

The product was distilled under reduced pressure of 100 mbar to 145° C. and the end product was adjusted with methoxypropyl acetate to around 20 000 mPas.

Yield: 844 g (764 g of crude resin in solution in 80 g of methoxypropyl acetate).

Both batches have substantially the same viscosity (around 20 000 mPas), a comparable solids content (about 90% by weight), and the same performance properties.

The invention claimed is:

1. A process for preparing a condensation resin, the process comprising:
reacting
at least one urea of formula (I), formula (II), or both:

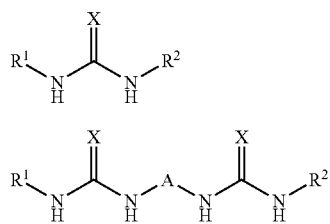

with
at least one 3-hydroxypropionaldehyde derivative of formula (IIa)

thereby obtaining the condensation resin,
wherein:
$R^1$ and $R^2$ each independently are hydrogen or a $C_1$-$C_{20}$ alkyl radical,
A is a $C_1$-$C_{20}$ alkylene radical,
X is oxygen or sulfur,
$R^3$ and $R^4$ each independently are a $C_1$-$C_4$ alkyl,
$R^3$ and $R^4$ optionally form a ring,
a molar ratio of the at least one urea and the at least one 3-hydroxypropionaldehyde derivative is from 1:2 to 1:12, and
the at least one 3-hydroxypropionaldehyde derivative comprises, in the form of an aqueous solution with a strength of 30 to 90%, formaldehyde in a bound or an unbound form in an amount of not more than 5% by weight.

2. The process according to claim 1, wherein the at least one urea is urea ($H_2N$—(CO)—$NH_2$).

3. The process according to claim 1, wherein the at least one 3-hydroxypropionaldehyde derivative is selected from the group consisting of 3-hydroxy-2,2-dimethylpropionaldehyde, 3-hydroxy-2-ethyl-2-n-butylpropionaldehyde, 3-hydroxy-2-methyl-2-n-propylpropionaldehyde, and 3-hydroxy-2-ethyl-2-n-butylpropionaldehyde.

4. The process according to claim 1, wherein said reacting occurs at a temperature of from 70 to 150° C. for a period of from 10 minutes to 6 hours.

5. The process according to claim 1, wherein said reacting occurs in the presence of an acid or a base as a catalyst and optionally in the presence of a solvent, a diluent, or both.

6. The process according to claim 1, wherein said reacting occurs in the presence of at least one compound (IV) which has precisely two nucleophilic groups selected from the group consisting of a hydroxyl group (—OH), a primary amino group (—$NH_2$), a secondary amino group (—NH—), and a thiol group (—SH).

7. The process according to claim 1, wherein said reacting occurs in the presence of at least one alcohol (V).

8. The process according to claim 2, wherein the at least one 3-hydroxypropionaldehyde derivative is selected from the group consisting of 3-hydroxy-2,2-dimethylpropionaldehyde, 3-hydroxy-2-ethyl-2-n-butylpropionaldehyde, 3-hydroxy-2-methyl-2-n-propylpropionaldehyde, and 3-hydroxy-2-ethyl-2-n-butylpropionaldehyde.

9. The process according to claim 2, wherein said reacting occurs at a temperature of from 70 to 150° C. for a period of from 10 minutes to 6 hours.

10. The process according to claim 3, wherein said reacting occurs at a temperature of from 70 to 150° C. for a period of from 10 minutes to 6 hours.

11. The process according to claim 5, wherein said reacting occurs in the presence of at least one compound (IV) which has precisely two nucleophilic groups selected from the group consisting of a hydroxyl group (—OH), a primary amino group (—$NH_2$), a secondary amino group (—NH—), and a thiol group (—SH).

12. The process according to claim 5, wherein said reacting occurs in the presence of at least one alcohol (V).

13. The process according to claim 6, wherein said reacting occurs in the presence of at least one alcohol (V).

14. The process according to claim 8, wherein said reacting occurs at a temperature of from 70 to 150° C. for a period of from 10 minutes to 6 hours.

15. The process according to claim 1, wherein the process does not comprise reaction with free formaldehyde and free CH-acidic aldehyde.

16. The process according to claim 1, wherein the urea is of formula (I).

17. The process according to claim 1, wherein the urea is of formula (II).

18. The process according to claim 1, comprising reacting with the 3-hydroxypropionaldehyde, both the urea of formula (I) and formula (II).

19. The process according to claim 1, wherein $R^3$ and $R^4$ form a ring.

* * * * *